Figure 5:
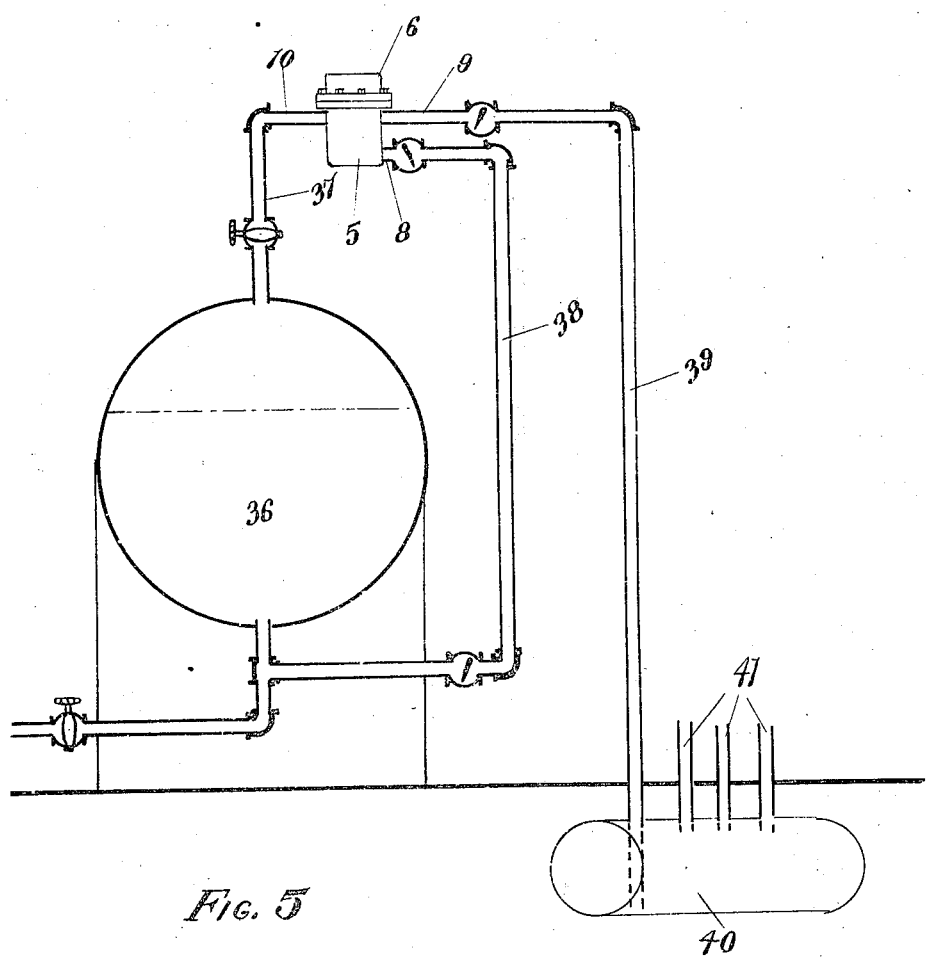

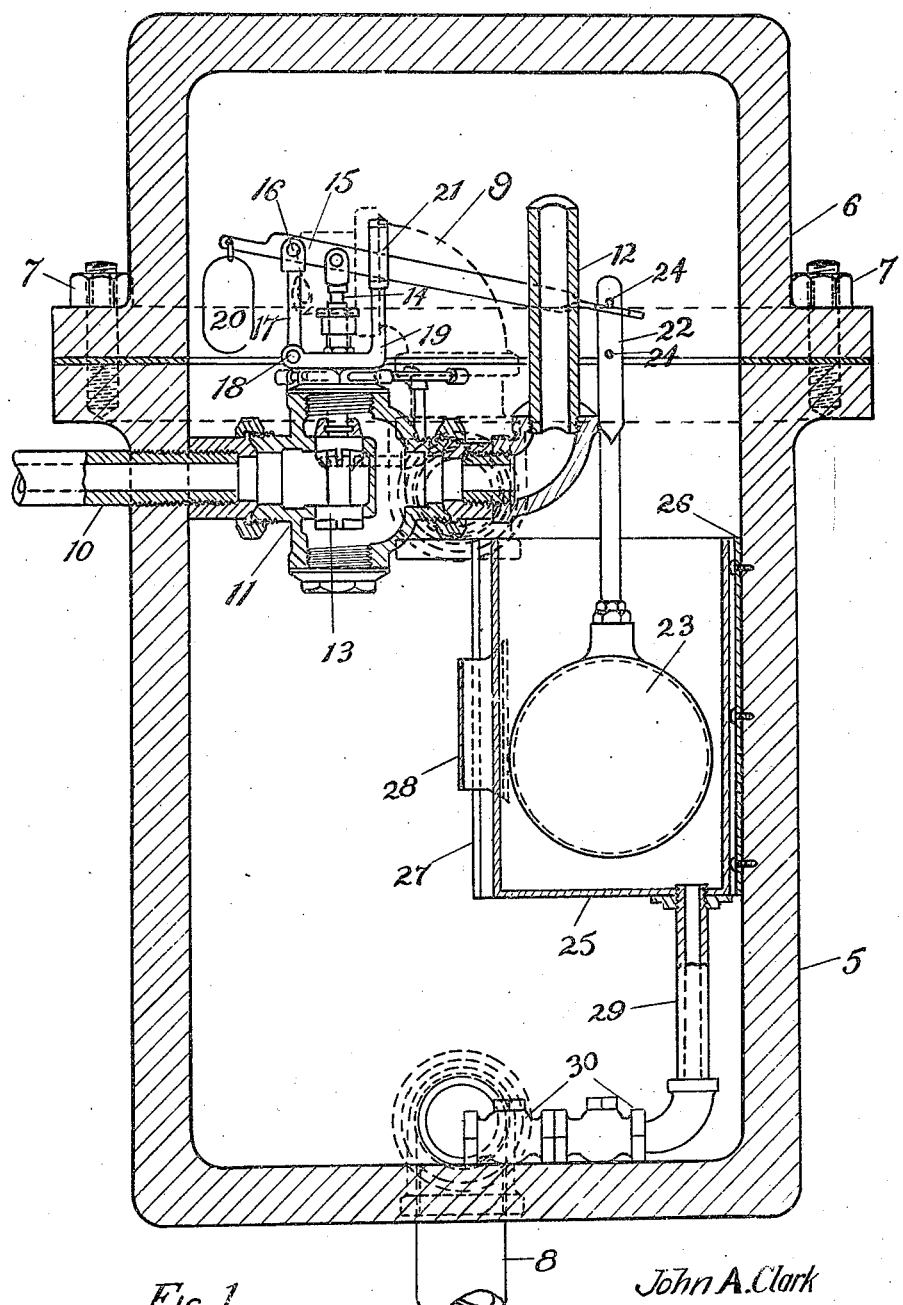

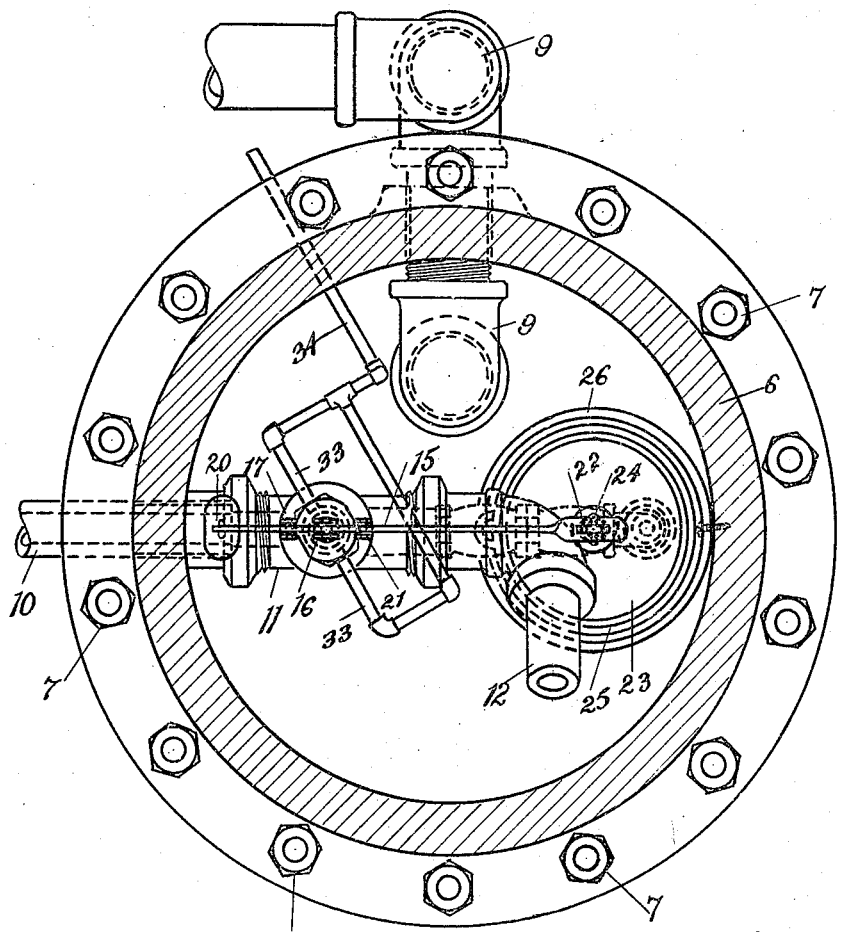
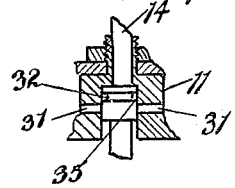
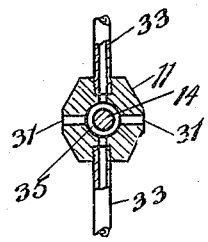

Patented Feb. 28, 1928.

1,660,705

UNITED STATES PATENT OFFICE.

JOHN A. CLARK, OF HARRISBURG, PENNSYLVANIA.

STEAM TRAP.

Application filed July 9, 1925. Serial No. 42,523.

The present invention relates to water traps for steam lines, the object being to provide novel mechanism whereby the liquid will be allowed to accumulate in a container and when the desired amount has been approximately reached, novel means are employed for quickly opening the steam supply valve in order to permit the free outlet of the liquid.

In the accompanying drawings:

Figure 1 is a vertical sectional view of the preferred embodiment of the invention, Figure 2 is a horizontal sectional view therethrough, Figure 3 is a detail sectional view of the vent-controlling means, Figure 4 is a horizontal sectional view through said vent-controlling means, Figure 5 is a diagrammatic view illustrating a system in which the trap can be successfully employed.

In the embodiment disclosed, a liquid container 5 is employed, which may have a detachable top or cap member 6, suitably bolted thereto, as shown at 7. An outlet pipe for the liquid is illustrated at 8, and an inlet for the vapor and liquid is disclosed at 9.

A steam supply pipe 10 extends through one side of the container, and has secured to its inner end a valve casing 11. To this valve casing is connected an upwardly extending outlet pipe 12 opening into the upper portion of the chamber. Within the valve casing is a reciprocatory steam controlling valve 13 having a vertical stem 14 suitably connected to an operating lever 15. This lever is fulcrumed, as shown at 16, on the upper end of a link 17, pivoted as illustrated at 18, to a bracket 19 secured on the valve casing. One arm of the lever carries a counterweight 20. The other arm extends through a guide 21, and its free end extends across the vertical stem 22 of a float 23 arranged within the casing 5. This stem 22 has cross pins 24 on opposite sides of the lever and adapted to engage the same, respectively, as the float rises and falls.

The float 23 is located within a cup 25 mounted to vertically reciprocate. This may be accomplished by locating the cup within a tubular guide 26 fastened to one wall of the container and having a slot 27 in which is slidably located a guide element 28 carried by the cup 25. The cup 25 has an open upper end, and depending from its bottom is an outlet pipe 29 provided with one or more outwardly opening check valves 30.

For the purpose of venting the interior of the container, the upper end of the valve casing 11 has a plurality of ports 31 opening into an internal chamber 32, as shown in Figure 3. Leading from said chamber are pipes 33 having a common outlet 34 to a point outside the container. The valve stem 14 extends through the said chamber 32 and is provided with an annular groove 35 that is movable into communication with the ports 31 and pipes 33 when the valve is depressed and in its closed position and is movable out of communication with said ports and pipes when the valve is opened.

The trap may be employed in a variety of situations. For example, as illustrated in Figure 4, a steam boiler is shown at 36, and has a stem connection 37 with the pipe 10, of the container 5—6. The outlet 8 is connected by a pipe 38 with the lower side of the boiler 36. The liquid supply pipe 9 has a line connection 39 with the lower end of a condensation receiver 40 that receives the liquid from one or more apparatuses through connections 41.

The operation of this structure is substantially as follows: Assuming the container empty, the cup 25 will be in its lowermost position, as illustrated in Figure 1 and the float 23 will also be in its lowermost position. As a consequence the lever 15 will be depressed and the valve 13 will be closed. Water entering through the pipe 9 will accumulate in the container 5, and as the level of the water rises, it will reach the cup 25 and elevate the same until the cup strikes the bottom of the pipe 12 which here acts as a stop. The water will continue to rise within the container until it overflows the cup, whereupon it will begin to rise in said cup and obviously at a much greater rate of speed than the level rose in the container. As a consequence the buoyancy of the cup will soon be destroyed and it will sink. The liquid therefore will rush into it as it begins to sink, thus causing the float 23 to rise rapidly, closing the vent, opening the valve and permitting steam at boiler pressure to enter the upper portion of the container, thus equalizing the pressure in the container whereupon the liquid will pass out through the pipe 8 to the boiler. As the level of the liquid lowers the cup will again gravitate until stopped by the abutment of the check valves 30 upon the bottom of the container and as said liquid in the container outside the cup moves downwardly below the level of the liquid in the cup it will be obvious that the liquid will also flow out of the cup until both container and cup are drained. When this has occurred the filling operation again begins to take place.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. In apparatus of the character set forth, the combination with a container for liquid, of means for controlling the flow of the liquid from the container including a valve, a float operated by the liquid in the container, and means for initially allowing the level of the liquid to rise above the level of the float and preventing its access to said float and thereafter allowing the liquid accumulated in the container and held from access to the float to flow to said float and at a greater rate than that supplied to the container and elevate the float quickly to operate the valve.

2. In apparatus of the character set forth, the combination with a container for liquid, of means for controlling the flow of the liquid from the container including a valve, a float operated by the liquid in the container, a cup containing the float and movable in the container, said cup floating in the liquid, and means for causing the liquid to flood the cup and sink the same, thereby giving the liquid quick access to the float, causing it to quickly rise, and operate the valve.

3. In apparatus of the character set forth, the combination with a container for the liquid, of means for controlling the flow of liquid from the container, including a valve, a cup movably located in the container and rising with the liquid therein, and a float for operating the valve movably located in the cup and moved therein by liquid entering the cup.

4. In apparatus of the character set forth, the combination with a container for the liquid, of means for controlling the flow of liquid from the container, including a valve, a cup movably located in the container and rising with the liquid thereon, a float for operating the valve movably located in the cup, means for stopping the upward movement of the cup to permit the liquid in the container to enter it and thereby cause the elevation of the float in the cup, and means for permitting the outflow of liquid from the cup when the liquid level within the container falls.

5. In apparatus of the character set forth, the combination with a container for the liquid having a liquid inlet and a liquid outlet, of means for admitting fluid under pressure to the container, a valve controlling said fluid admitting means, a float in the container for operating the valve, and a cup movably mounted in the container and having the float movable therein, said cup having means for admitting liquid into its upper portion, and means for draining the cup when the liquid in the container falls.

6. In apparatus of the character set forth, the combination with a container for the liquid having a liquid inlet and a liquid outlet, of means for admitting fluid under pressure to the container, a valve controlling said fluid admitting means, a float in the container for operating the valve, a cup movably mounted on the container and having the float therein, said cup having an open top for permitting the overflow of the liquid thereinto, and a valved outlet port in the lower portion of the cup.

7. In apparatus of the character set forth, the combination with a container for the liquid having a liquid inlet and a liquid outlet, of means for admitting fluid under pressure to the container, a valve controlling said fluid admitting means, a float in the container for operating the valve, a cup movably mounted in the container and having the float therein, said cup having an open top for permitting the overflow of the liquid thereinto, a valved outlet port in the lower portion of the cup, a vent means for the container, and a valve controlling the vent and operated by the float in alternation with the fluid controlling valve.

8. In apparatus of the character set forth, the combination with a container for the liquid, of means for controlling the flow of liquid from the container, including a valve, a float for operating the valve, a buoyant cup for containing the float, and means whereby the buoyancy of the cup is destroyed and it will sink and expose the float to the elevating action of the liquid in the container.

9. In apparatus of the character set forth, the combination with a container for the liquid, of means for controlling the flow of fluid into the container, including a valve, a float for operating the valve, a buoyant cup for containing the float, and means whereby the buoyancy of the cup is destroyed and it will sink and expose the float to the elevating action of the liquid in the container.

10. In apparatus of the character set forth, the combination with a container for the liquid, of means for controlling the flow of fluid into the container, including a valve, a float for operating the valve, a buoyant cup for containing the float, and initially keeping the liquid in the container from operating on the float, and means for positioning the cup to admit liquid thereto, whereby its buoyancy is destroyed and it will sink and thereby expose the float to the elevating action of the liquid in the container.

In testimony whereof, I affix my signature.

JOHN A. CLARK.